United States Patent
Noujima et al.

(10) Patent No.: US 7,527,660 B2
(45) Date of Patent: May 5, 2009

(54) HYDROGEN FUEL MANUFACTURING METHOD AND SYSTEM WITH CONTROL PROGRAM FOR USE THEREIN

(75) Inventors: Masafumi Noujima, Hitachi (JP); Takeyuki Itabashi, Hitachi (JP); Takao Ishikawa, Hitachi (JP); Hiroshi Kanemoto, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 381 days.

(21) Appl. No.: 11/057,384

(22) Filed: Feb. 15, 2005

(65) Prior Publication Data

US 2005/0276749 A1 Dec. 15, 2005

(30) Foreign Application Priority Data

Jun. 10, 2004 (JP) ............... 2004-171979

(51) Int. Cl.
*C01B 3/02* (2006.01)
*F17D 1/04* (2006.01)

(52) U.S. Cl. ............... 48/197 R; 48/61; 48/120; 48/190; 62/46.1; 62/46.2; 204/157.52

(58) Field of Classification Search ............... 48/120, 48/127.3, 190, 61; 62/46.1, 46.2; 204/157.15, 204/157.4, 157.52, 242, 255, 256
See application file for complete search history.

(56) References Cited

U.S. PATENT DOCUMENTS

| 4,211,537 | A | * | 7/1980 | Teitel ............... 48/191 |
| 4,302,217 | A | * | 11/1981 | Teitel ............... 48/189.2 |
| 4,461,398 | A | * | 7/1984 | Argy ............... 220/560.06 |
| 4,923,582 | A | * | 5/1990 | Abrahamson et al. ....... 204/255 |
| 5,279,484 | A | * | 1/1994 | Zimmermann et al. ... 244/171.1 |
| 5,666,923 | A | * | 9/1997 | Collier et al. ............... 123/488 |
| 6,214,181 | B1 | * | 4/2001 | Iacopetti et al. ............. 204/256 |
| 6,685,821 | B2 | * | 2/2004 | Kosek et al. ................ 205/637 |

(Continued)

FOREIGN PATENT DOCUMENTS

DE    30 20 233 A1    12/1980

(Continued)

OTHER PUBLICATIONS

German Office Action, with English Translation, issued in German Patent Application No. DE 10-2005-006-774.3-41, dated May 26, 2008.

*Primary Examiner*—Walter D Griffin
*Assistant Examiner*—Huy-Tram Nguyen
(74) *Attorney, Agent, or Firm*—McDermott Will & Emery LLP

(57) ABSTRACT

A hydrogen fuel manufacturing system capable of efficiently producing each hydrogen fuel in accordance with a demanded quantity is disclosed. The system includes a hydrogen manufacturing apparatus for manufacturing hydrogen, more than two hydrogen fuel manufacturing apparatuses for manufacturing hydrogen fuels by letting the hydrogen produced by the hydrogen manufacturing apparatus change into a fuel-use form, wherein the fuel form to be manufactured by the hydrogen fuel manufacturing apparatuses is set to have more than two kinds. Additionally the system has a hydrogen fuel production volume receiver device for receipt of the information as to a hydrogen fuel production volume, thereby controlling the production volume of the hydrogen fuel being manufactured by the hydrogen fuel manufacturing apparatus, based on the hydrogen fuel production volume information as received by the hydrogen fuel production volume receiver device.

11 Claims, 11 Drawing Sheets

U.S. PATENT DOCUMENTS

| | | |
|---|---|---|
| 6,748,748 B2 * | 6/2004 | Bradley et al. ............... 62/46.1 |
| 6,841,893 B2 * | 1/2005 | Maiwald et al. ............... 290/43 |
| 6,984,296 B1 * | 1/2006 | Gestermann ................ 204/252 |
| 2003/0062268 A1 * | 4/2003 | Kosek et al. ................ 205/637 |
| 2003/0077489 A1 | 4/2003 | Sahoda |
| 2003/0226365 A1 * | 12/2003 | Bradley et al. ............... 62/46.1 |
| 2004/0016769 A1 * | 1/2004 | Redmond ..................... 222/3 |
| 2004/0023087 A1 * | 2/2004 | Redmond .................... 429/19 |
| 2004/0118677 A1 * | 6/2004 | Streckert et al. ............ 204/237 |

FOREIGN PATENT DOCUMENTS

| | | |
|---|---|---|
| DE | 44 00 003 A1 | 7/1995 |
| DE | 195 37 024 C2 | 4/1996 |
| DE | 195 23 939 C2 | 1/1997 |
| DE | 195 28 681 C2 | 2/1997 |
| DE | 197 05 601 A1 | 8/1998 |
| DE | 100 31 491 A1 | 1/2002 |
| DE | 102 41 688 A1 | 5/2003 |
| EP | 0 653 585 A1 | 5/1995 |
| GB | 2 051 867 A | 1/1981 |
| JP | 2001-315111 | 11/2001 |
| JP | 2002-372199 A | 12/2002 |
| JP | 2003-130295 | 5/2003 |
| JP | 2004-83385 A | 3/2004 |
| JP | J2004-84933 A | 3/2004 |
| JP | 2004-220802 A | 8/2004 |
| WO | WO 00/69773 | 11/2000 |

* cited by examiner

FIG.7

| | RESIDUAL FUEL Q'TY |
|---|---|
| 0 ~ 1 | |
| 1 ~ 2 | |
| 2 ~ 3 | |
| 3 ~ 4 | |
| | |
| 22 ~ 23 | |
| 23 ~ 24 | |

| | 1/1 | 1/2 | ..... | 12/31 | FUEL USED |
|---|---|---|---|---|---|
| 0 ~ 1 | | | | | |
| 1 ~ 2 | | | | | |
| 2 ~ 3 | | | | | |
| 3 ~ 4 | | | | | |
| | | | | | |
| 24 ~ 0 | | | | | |
| 0 ~ 24 | | | | | |

HYDROGEN FUEL MANUFACTURING METHOD AND SYSTEM WITH CONTROL PROGRAM FOR USE THEREIN

BACKGROUND OF THE INVENTION

The present invention relates to a hydrogen fuel manufacturing system, a hydrogen fuel manufacturing method, and a hydrogen fuel manufacturing program.

In recent years, natural resource depletion and environmental destruction are regarded as a big problem on the earth, and it is highly required to establish the so-called zero emission type societies by means of recyclable energies. To solve this problem, it is recommendable to utilize natural energy sources such as the wind force and sunlight or the like. It is also recommended to exploit naturally existing energies that remain unused. Utilization of hydrogen that is almost infinitely present in the natural world also attracts the attention of those skilled in the art. The hydrogen is a storable and stockable energy source, which has focused attention as an alternative energy to fossil fuels.

Unfortunately, the active use of the above-noted natural energies is not yet widely popularized so that currently available electrical power generation still relies on the power generation with traditional fossil fuels as raw materials, which emit a great amount of carbon dioxide ($CO_2$) gases. One reason of this is as follows. Since the quantity of electric power to be generated by using natural energy sources is much variable depending upon natural environments, it is very difficult to constantly supply electric power in a demand-oriented manner. However, in the today's trend of urging the inhibition of ecological destruction, people who demands clean energies has increased in number.

Consequently, in order to avoid these energy problems, it is expected to introduce a hydrogen energy and fuel battery cells using the same into land vehicles and homes. The hydrogen is chemically reacted with oxygen to release an energy while emitting water only. This reaction emits nothing other than the water. The hydrogen is manufacturable from several raw material by various techniques including, but not limited to, electrolyzation of water and quality modification of fossil energies and methanol compositions. With this approach, it becomes possible to store or stock it in high-pressure tanks or liquefaction tanks or hydrogen-absorbed alloys. By letting it chemically alter into the form of an organic hydride or methanol or the like, it is also possible to stock and supply hydrogen fuels.

Additionally, taking into consideration risks of an extreme energy loss occurring depending on the supply forms and also economical profits for high-pressure hydrogen, it seems likely that the business investment must be as small in scale as possible. However, using small-scale facility poses another problem as to an unwanted increase in cost or price of such hydrogen energy, which can occur due to the lack of an ability to smoothly perform the fuel supply required.

In addition, the hydrogen is generally believed to be a dangerous material, which requires equipment facility to have sufficient safety remedies so that an increased cost is taken for initial investment while increasing running costs thereof. Thus it is necessary to sell it while adding certain extra values to the hydrogen.

An approach to solving the above-noted problems is disclosed, for example, in JP-A-2001-315111 and JP-A-2003-130295. In this approach, a hydrogen-fueled land vehicle is designed to have communication functionalities, for informing a hydrogen supplying station of the fuel demander's fuel consumption information to thereby comprehend a hydrogen amount required for the hydrogen-fueled car, which is supposed to come to the hydrogen station sooner or later. Thus it becomes possible to set up a plan for filling the hydrogen into each hydrogen car at the hydrogen station. This indicates that even at a relatively small-scale hydrogen supply station, it is possible by manufacturing the hydrogen according to the plan to perform smooth and stable hydrogen refilling. It also indicated that the facility costs are reduced while lowering hydrogen prices.

However, the hydrogen is faced with several problems concerning the filling density and safety and also the necessity to argue about the inevitability of the use of fossil fuels, which problems occur depending upon the type of each supplying form. Hence, the hydrogen supply form is not exactly determined yet. Due to this, at the first stage or "seedtime" of the hydrogen that begins to be commercially popularized as a useful energy in human society, the hydrogen supply form varies from consumer to consumer and is thought to be hardly standardized. Accordingly, upon popularization of some hydrogen fuels, each hydrogen fuel is manufactured, resulting in scramble for the hydrogen that is a raw material. This leads to an increase in hydrogen price due to demand-versus-supply principles in the marketplace, which results in the hydrogen becoming higher in retail price.

SUMMARY OF THE INVENTION

It is therefore an object of the present invention to provide a multi-hydrogen fuel supply system and a hydrogen fuel supply method, each of which is capable of efficiently manufacturing and managing each hydrogen fuel in accordance with a demand quantity, thereby to promote the popularization of the hydrogen for use as an energy preferable for global environments.

One principal feature of the present invention is that a hydrogen fuel manufacturing system includes a hydrogen manufacturing apparatus for manufacture of hydrogen and more than two hydrogen fuel manufacturing apparatuses for producing hydrogen fuels while changing each of them into a fuel form that uses as a fuel the hydrogen that was produced by the hydrogen manufacturing apparatus, wherein the hydrogen fuel manufacturing apparatus-produced fuel form is of more than two kinds.

Another feature of this invention lies in a hydrogen fuel manufacturing method which has a hydrogen step of producing hydrogen by a hydrogen manufacturing apparatus and a hydrogen fuel production step of using more than two hydrogen fuel manufacturing apparatuses to manufacture hydrogen fuels while changing each of them into a fuel form that uses as a fuel the hydrogen as created by the hydrogen manufacturing apparatus, wherein in the hydrogen fuel production step, the hydrogen fuel manufacturing apparatus-produced fuel form is of more than two kinds.

A further feature of the invention lies in a software-programmed computer having a hydrogen manufacturing means for the manufacture of hydrogen and more than two hydrogen fuel manufacturing means for manufacturing hydrogen fuels while changing each of them into a fuel form that uses as a fuel the hydrogen as produced by the hydrogen manufacturing means, wherein the hydrogen fuel manufacturing means-produced fuel form is of more than two kinds.

These and other features and advantages of the invention will be explained in the following description.

According to the invention, it is possible to efficiently manufacture hydrogen fuels even where there are a plurality of hydrogen supply forms or modes.

BRIEF DESCRIPTION OF THE DRAWINGS

FIG. 7 is a diagram showing a fuel management sheet of the embodiment 2.

FIG. 8 is a diagram showing a structure of fuel use amount data of each demanding person's house (Part 1).

DETAILED DESCRIPTION OF THE INVENTION

Currently preferred embodiments of the present invention will be explained in detail with reference to the accompanying drawings below.

Embodiment 1

This embodiment concerns a basic arrangement in a multiple-hydrogen fuel supplying system and a hydrogen fuel supply method.

Figure 1:
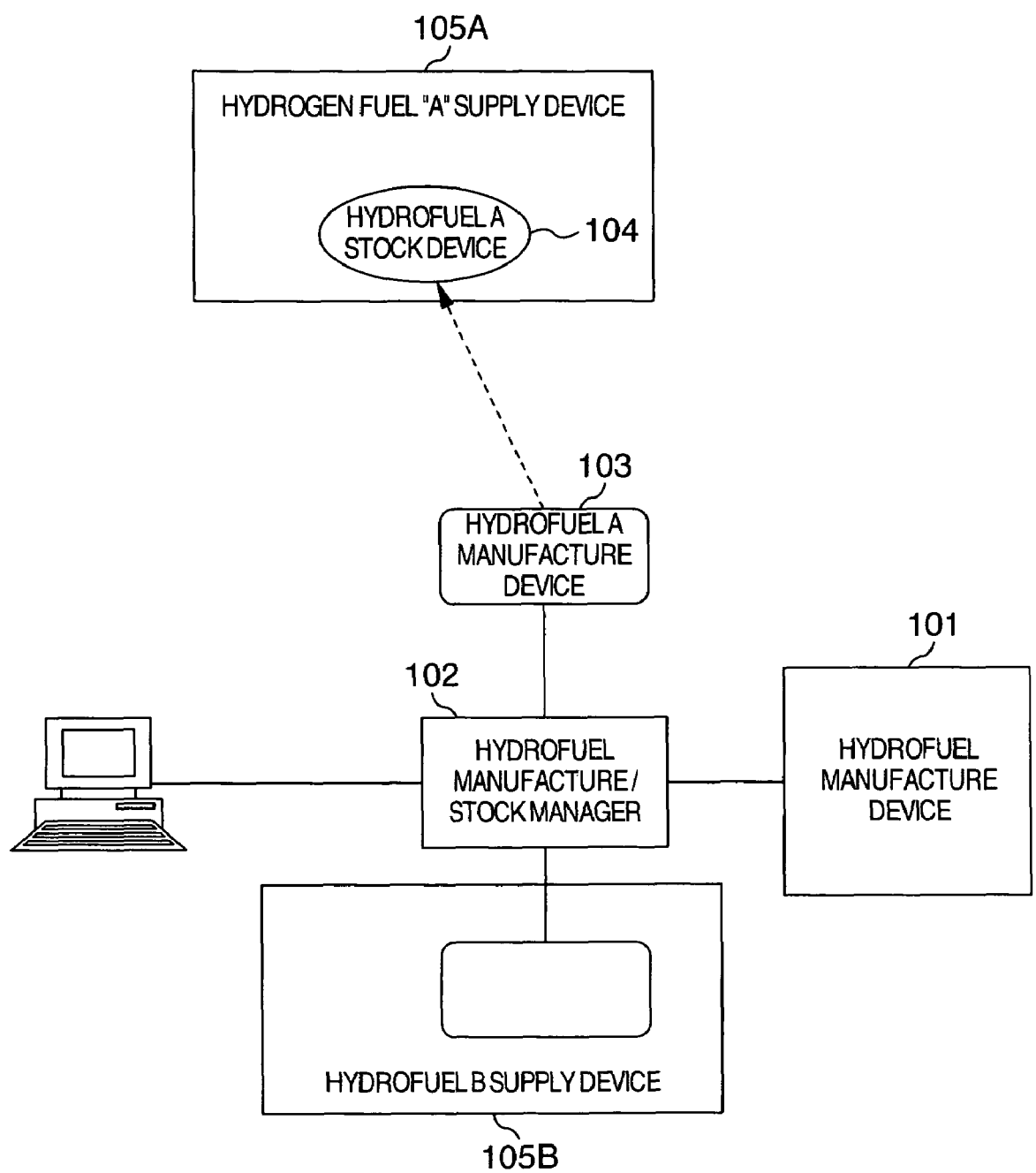
FIG. 1 is a diagram showing an arrangement of a hydrogen fuel supply system of an embodiment 1.

A configuration of the multi-hydrogen fuel supply system of this embodiment is shown in FIG. 1. As shown herein, the multi-hydrogen fuel supply system 101 is arranged to permit hydrogen, which is manufactured by a hydrogen manufacturing apparatus 101, to flow through a pipe to a hydrogen fuel "A" manufacturing/stock device. A hydrogen fuel A manufacturing apparatus 103 and a hydrogen fuel A stock device 104 are each provided with a supply device for supplying fuels to hydrogen fuel demanding persons' houses. Provided among the hydrogen manufacturing apparatus 101 and hydrogen fuel A manufacturing apparatus 103 plus hydrogen fuel A stock device 104 is a hydrogen fuel manufacture/stock management device 102 that is a core part of this system. The hydrogen fuel manufacture/stock manager device 102 is configured from a control device or a control-use management server for controlling the apparatuses involved. In this embodiment, the individual one of the hydrogen manufacturing apparatus 101 and hydrogen fuel manufacture/stock manager device 102 is a single body of equipment, whereas the hydrogen fuel manufacture/stock manager device and the hydrogen fuel manufacturing apparatus plus hydrogen fuel supply devices 105A-105B are a plurality of more than two machines. Although it is preferable that the hydrogen fuel A manufacturing apparatus 103 be within the same site as that of the hydrogen fuel A supply device 105A, the apparatus may be installed at a far location as shown by a broken line in FIG. 1. Even in this case, it satisfies this embodiment as far as the hydrogen manufacturing apparatus 101 is shared in use.

Although in this embodiment the hydrogen manufacturing apparatus 101 is illustrated for practical implementation as an electrolyzer using surplus electric power of nuclear power generation or wind-generated power, a hydrocarbon gas quality reforming or "modifying" device, a bio-mass hydrogen manufacturing machine or a by-product hydrogen of chemical plants, this invention should not exclusively be limited thereto.

The hydrogen fuel manufacturing apparatus and hydrogen fuel stock device are for changing the hydrogen into various forms and for storage of it when the hydrogen is used as a fuel. Practically there are considered as the hydrogen supplying form i) physically hydrogen storing techniques such as a scheme for containing the hydrogen in a high-pressure tank for supplement while adding a high pressure thereto, a method of supplying while containing in a tank a hydrogen-absorbed metal alloy capable of absorbing the hydrogen in a metal, and a scheme for cooling the hydrogen for liquefaction and then stocking it in a low-temperature cooling conservation device (cryostat) and ii) chemically storing methods for stocking the hydrogen in the form of hydrogen atom-containing chemical compounds, for example, decalin, cyclohexane, toluene, petroleum oil, coal oil, dimethylether (DME) or any equivalents thereto, although not specifically limited thereto. In the chemical stock methodology, the hydrogen must be processed while letting it chemically react with benzene rings. The physical stock methods are such that an energy is added to the hydrogen for stock so that an energy loss can sometimes take place in long-term storage events. Additionally, these are highly risky methods because these are the schemes for directly processing and storing the hydrogen that is high in explosibility. On the other hand, the chemical stock methods are less in risks of hydrogen loss and energy loss of hydrogen fuels as used therein; however, these will possibly be implemented for limited use applications because an increased thermal energy is required upon release of the hydrogen. In addition, the chemical stock methods are less in explosibility than the physical stock methods and thus are low-risk storage methods. In the illustrative embodiment, it is possible to design the above-noted plurality of hydrogen fuel supplying facilities to set risks, such as the safety, at low levels and also to install multiple hydrogen fuel manufacture/stock means within the same site. In this embodiment, it is not always necessary that the hydrogen fuel manufacturing apparatus and its associated hydrogen storage device are at the same location. In this case, the hydrogen fuel is transported by a truck, a tank lorry or a pipeline between the installation location of the hydrogen fuel manufacturing apparatus and the hydrogen stock location.

For example, high-pressure hydrogen supply for the manufacture of a high-pressure gas and an organic hydride that is low in explosibility are combined together for performing the supply within the same site. Alternatively, a liquid hydrogen and high-pressure hydrogen may be supplied on the same line. Whereby, it becomes possible to lessen equipment expenses and site area. This makes it possible to supply the hydrogen at low costs.

Figure 2:
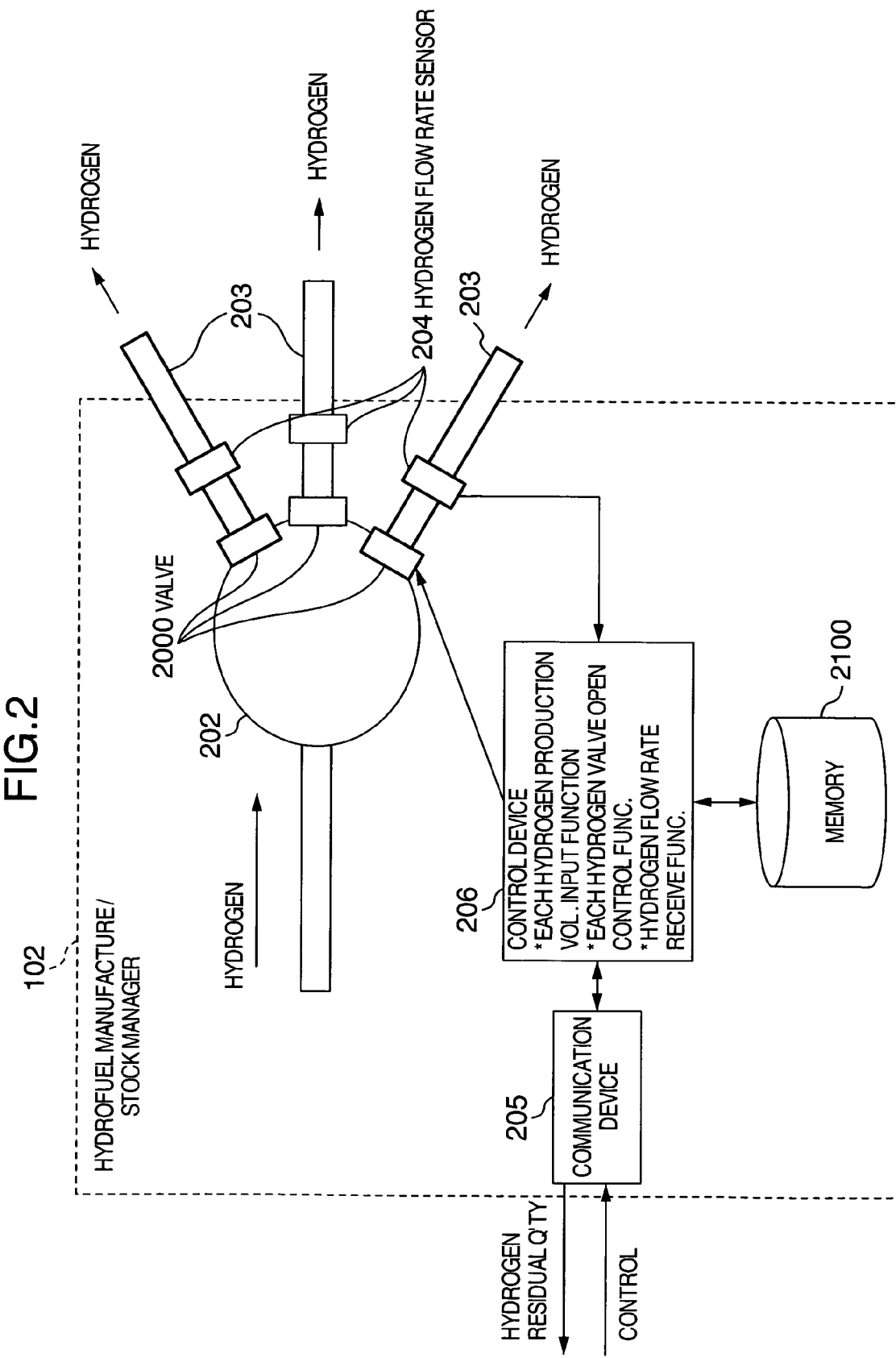
FIG. 2 is a diagram showing a configuration of a hydrogen fuel manufacture/stock management apparatus of the embodiment 1.

The hydrogen fuel manufacture/stock management device has the function of distributing the hydrogen that was produced by the hydrogen manufacturing apparatus to each hydrogen fuel manufacturing apparatus. A practically reduced hydrogen fuel manufacture/stock management device is shown in FIG. 2.

Figure 3:
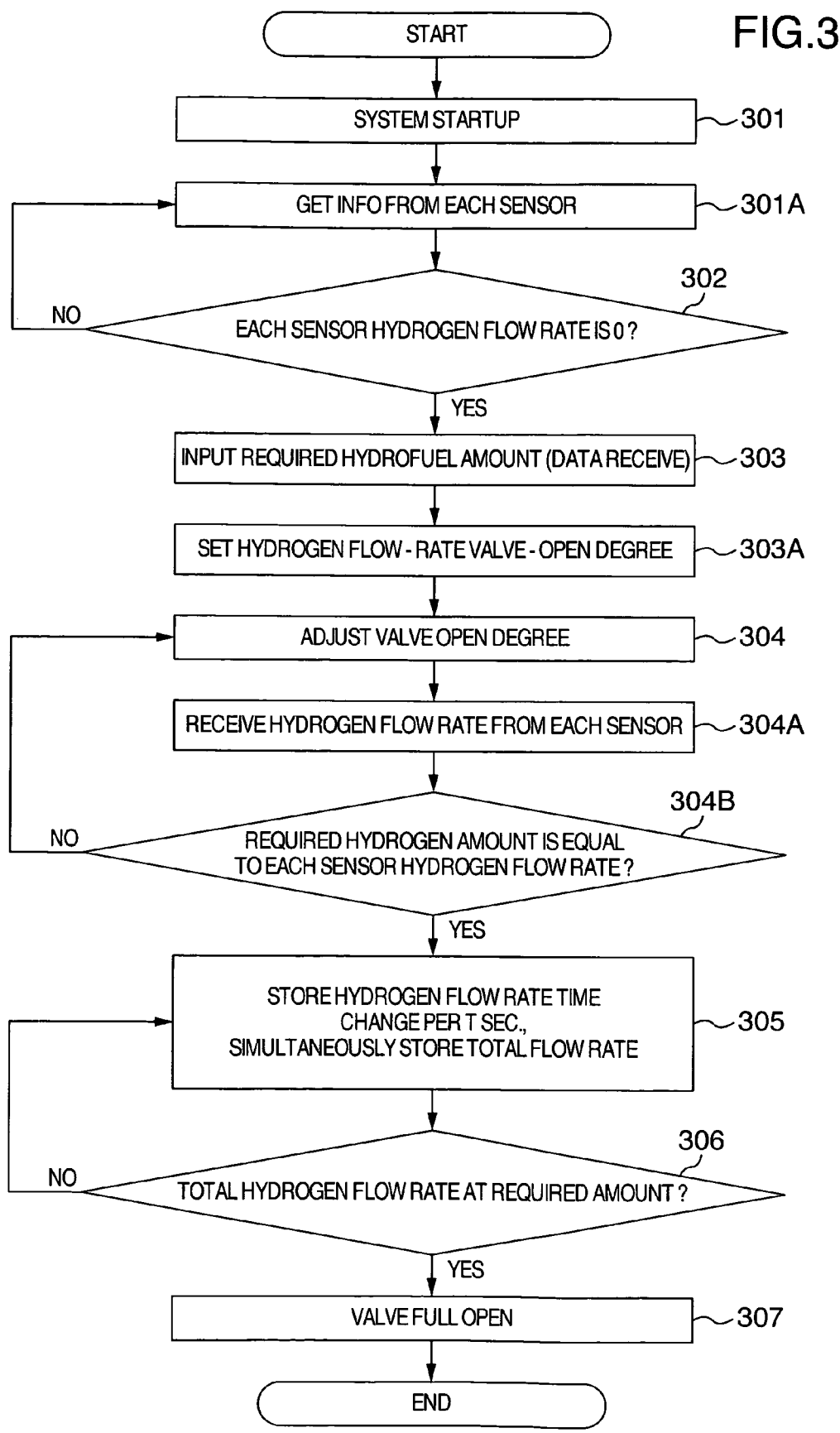
FIG. 3 is a diagram showing a hydrogen supply method of the embodiment 1.

In this embodiment the hydrogen fuel manufacture/stock management device 102 is generally made up of a housing 202 that permits split flow of the hydrogen being produced by the hydrogen manufacturing apparatus toward hydrogen fuel manufacturing apparatus, pipes 203 each of which is coupled to its associative hydrogen fuel apparatus, a valve 2000 with electronic control functions as provided between the housing 202 and each pipe 203, a hydrogen flow rate sensor 204 in the downstream of the valve, a control device 206 that is wirelessly connected or wired to the hydrogen flow rate sensors 204 and valves 2000 for obtaining information from a sensor to thereby activate its corresponding valve, and a memory 2100 that records or stores therein the information from the hydrogen flow rate sensors 204. When control is performed from the outside also, this control device is provided with a communication device 205 for sending and receiving the information to and from a management server via the communication device 205. The hydrogen fuel manufacture/stock manager device 102 performs the supply of hydrogen to each hydrogen fuel manufacturing apparatus in a process flow such as shown for example in FIG. 3. Firstly, let the system get started (at step 301). Whereby, the control device acquires hydrogen flow rate information from a sensor (at step 301A) and then makes sure that the hydrogen flow rate is zero (302). The fact that the hydrogen flow rate is zero means that the valve is completely closed in this case. At this time, all the sensors that are present in the hydrogen fuel manufacture/stock manager device and the control device perform updating. In its following steps, every sensor is to be updated in a similar way. Next, request a fuel manufacturer to input the production volume of each hydrogen fuel (303). Preferably the one to be input here may be a required production volume of each hydrogen fuel or an amount of hydrogen necessary for the hydrogen fuel production volume required. In the case of input of the required production volume of each hydrogen fuel, it is desirable to store in the memory the specification data of hydrogen fuel manufacture/stock apparatus, which indicates a necessary hydrogen quantity or the like with respect to certain hydrogen fuel.

After having inputted the hydrogen fuel production volume, set up an open degree of hydrogen flow rate valve in accordance with the input value (at step 303A of FIG. 3), and then control the valve by the control device to thereby allow the hydrogen to flow (304). At this time, the hydrogen sensor manages the flow rate of hydrogen fuel. If it is less than a specified level, then adjustment is done by reducing the open degree of another valve or the like (304A, 304B). Additionally the hydrogen sensor measures the hydrogen flow rate at time intervals of "t" seconds. Each measurement result is sent to the control device, which then records or stores it in the memory (305). At this time, a hydrogen flow rate "f" per interval of t seconds and a total flow rate F(t) of a time period of 0 to t seconds are recorded in the memory.

When F(t) reaches a predetermined quantity (at step 306), the control device closes this valve (307).

Assuming that the control device comprises a communication device for enabling transmission and receipt of information to and from the management server, it becomes possible to achieve externally access and data display or else. For the management server, it is possible to represent the memory's information in a table form or a text form for storage of a series of hydrogen flow rate information items. Using the above-noted series of process flow permits appropriate fuel distribution from the hydrogen manufacturing apparatus to the hydrogen fuel manufacture/stock apparatus. This in turn makes it possible to effectively manufacture the hydrogen fuel in a way conformity with the fuel consumption quantity of a fuel demanding person such as a consumer.

It becomes also possible to predict the demander's hydrogen fuel consumption amount by arranging the management server to comprise a database for managing several information items—such as hydrogen fuel consumption information, power demand information, weather information, date-and-time data and others—of a plurality of demander houses and a hydrogen fuel manufacture/stock plan management system for using the data from this database to calculate or statistically predict a plurality of hydrogen fuel consumption amounts or necessary amounts thereof.

Additionally, by attaching a sensor to the hydrogen stock device or reservoir of a demander house while causing the server to constantly manage the demander house's hydrogen fuel consumption information and/or hydrogen fuel residual quantity information, it becomes possible to predict the demander's hydrogen fuel consumption amount.

An explanation will here be given of differences of this embodiment from the arrangement disclosed in JP-A-2001-315111. In the arrangement taught by JP-A-2001-315111, hydrogen stations are connected together by communication links only, for computing the amount of a hydrogen to be supplied to each hydrogen station while looking at the hydrogen consumption situation of a land vehicle such as an automobile being registered to the station. However, this Japanese document is silent about the status of the hydrogen being supplied. In contrast, this embodiment is such that as its background, the hydrogen supply form in near future may include various ones such as high-pressure gases, liquids, chemical compounds and others and is based on the consideration in terms of efficient hydrogen manufacture while taking account of the distribution thereof. As this embodiment can manufacture the hydrogen in multiple kinds of fuel forms, it becomes possible by utilizing a limited hydrogen to efficiently manufacture the hydrogen fuel in an appropriate form in accordance with every demand. Additionally a principal concept of the embodiment lies in the technique for supplying a plurality of hydrogen fuels at a single location. Thus the hydrogen fuel manufacturer performs data processing of not only the residual amount but also the fuel kind. Thus, it is no longer required to provide interconnection between the hydrogen stations via data communication links. The distribution of a plurality of hydrogen fuels is computed based on the hydrogen to be supplied from a single hydrogen manufacturing apparatus. This distribution is predicted from the demand amount. Whereby, it becomes possible to efficiently manufacture hydrogen fuels by utilizing a limited amount of hydrogen.

Embodiment 2

Figure 4:
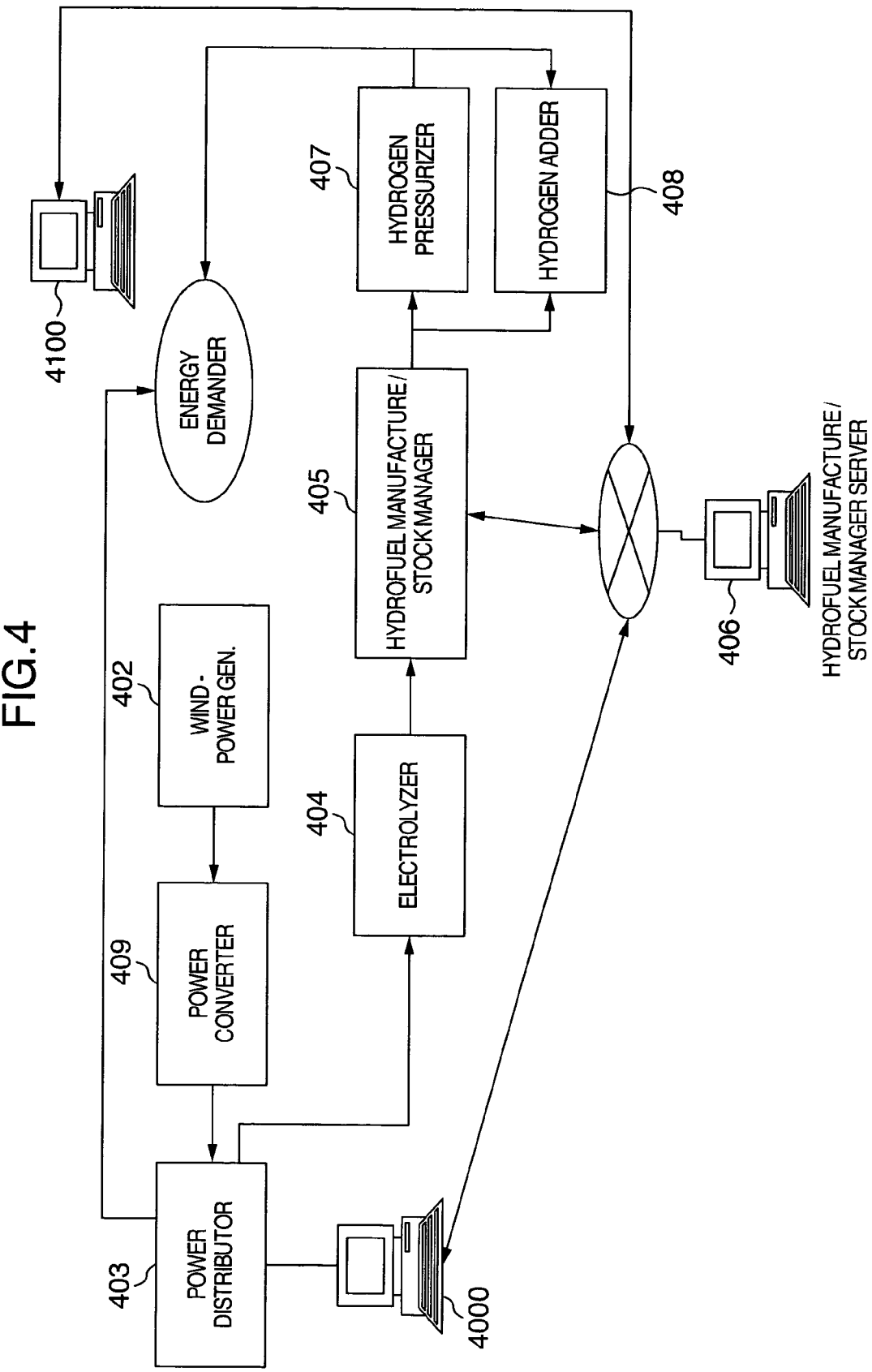
FIG. 4 is a diagram showing a hydrogen manufacturing method of an embodiment 2.

This embodiment is a method for manufacturing hydrogen fuel while employing the basic arrangement of Embodiment 1, which will be explained with reference to FIG. 4. For the hydrogen manufacture, an electrolyzer is employed which uses the electrical power of a wind-power generation apparatus. A high-pressure hydrogen or organic hydride is manufactured as the hydrogen fuel. A hydrogen station within the same site is used to supply it. In view of the fact that the power supply using natural energies such as the wind power is inherently difficult to achieve planned generation of the electric power, an approach to storing electric power in the form of a secondary energy for primary storage thereof must be an appropriate technique which can effectively store the electric power and which does not give the system power any baneful influence, such as reverse tidal streams.

Consequently, it is effective to flow a constant amount of generated electric power to the system power while at the same time converting surplus power into hydrogen fuel for supplement to fuel demanders or consumers. In this embodiment, the system is arranged to include an electric power generation amount management server 4000, a wind-power generator apparatus 402 and an electric power distribution equipment 403, which are owned by the decentralized power supply owner. The system also includes an electrolyzer 404, a hydrogen fuel manufacture/stock management device 405, a hydrogen fuel manufacture/stock management server 406, a hydrogen high-pressurizing device 407 and a hydrogen adding device 408, which are owned by a hydrogen fuel supplier. The system further includes a hydrogen fuel supply site (hydrogen station) for supplying the hydrogen fuel along with a fuel tank and a fuel battery as owned by a consumer. Note that the hydrogen station is owned by the fuel supplier.

A power converter device 409 and a power distribution device 410 make it possible to flow electric power to the electrolyzer 404 in case power generation equipment generates an excessive amount of power greater than a prespecified level. Preferably the power distribution device owned by a fuel demander and the power distributor owned by a hydrogen manufacturer are linked together via a dedicated or private communication line(s).

The power generation amount management server 4000 in power generating facility owned by a decentralized power supply owner is operable to input or calculate, at fixed time intervals, the amount of electrical power to be generated by a decentralized power supply and the amount of power to be consumed by the fuel demander, and then store them in a database within the server. Simultaneously, set a given preliminary or emergency power amount to the power consumption amount of the demander. Then, let a relationship of the generated power amount and the demander's power consumption amount along with the emergency power amount and surplus power amount be defined by:

$$\text{Surplus Power} = \text{Midnight Power} - (\text{Consumed Power} + \text{Emergency Power}) \quad (1)$$

Next, substitute the data being stored in the server to the above Equation, thereby obtaining the surplus power.

The surplus power amount thus obtained is sent via communications links such as the Internet or equivalents thereto, which will be received by the server 406 that is installed in the hydrogen fuel manufacturer, and then stored in the database within the server.

The hydrogen fuel manufacturer obtains the information as to the system and the surplus power from the distributed power supply and then controls the power distribution equipment as installed in each location in such a way as to send electric power that is equal to or less in quantity than that of the surplus power toward the electrolyzer 404 owned by the hydrogen fuel supplier.

The hydrogen fuel manufacturer electrolyzes water and an electrolytic solution (alkali electrolyte such as NaOH for example) to thereby create hydrogen and oxygen. The hydrogen fuel manufacture/stock management server 406 receives the data of surplus power amount to be sent from the power generation amount manager server 4000 and then estimates from the surplus power amount a generated hydrogen amount. The hydrogen generated is then sent to the hydrogen fuel manufacture/stock manager device 405, which determines each hydrogen fuel production volume based on the generated hydrogen amount as received by the hydrogen fuel manufacture/stock manager and each hydrogen fuel consumption information, which is then distributed to each hydrogen fuel manufacture/stock manager device 405. One preferable transportation scheme used in this event is to deliver it by pipes to the nearest possible location. It is also preferable to perform transportation in a way which follows: the hydrogen high-pressurizer device 407 or else is used to perform compression for storage into a high-pressure tank or to store in a low-temperature retention device after liquefaction. In the case of such high-pressure tank, a device for adding a high pressure to the hydrogen is provided between the electrolyzer device and the hydrogen stock device. Alternatively in the case of the low-temperature retention device, a liquefier is provided.

In this embodiment, the hydrogen is supplied to the fuel demander or consumer in the form of a high-pressure gas or organic hydride.

It is also likely that a plurality of hydrogen fuel manufacturers are associated with the system. In case such multiple types of hydrogen fuel manufacturers manufacture a plurality of kinds of fuels, a facility is provided for management of several production volumes in an all-at-once manner.

An explanation will next be given of a method for enabling the above-noted hydrogen fuel manufacturer to determine the production volume of each fuel.

The amount of consumed hydrogen fuel is predictable by a hydrogen fuel consumption prediction system as built in the hydrogen fuel manufacture/stock management server 406, which performs each hydrogen fuel demand prediction by multiple linear regression analysis using each fuel use amount, weather, air temperature, consumer, fuel kind, wind direction and humidity as independent parameters to thereby determine an appropriate hydrogen fuel production volume at the surplus hydrogen. Based on this prediction function, predict a time point whereat the residual amount becomes zero and then obtain such the time per each consumer, followed by determination of an adequate hydrogen fuel manufacturing plan.

Figure 5:
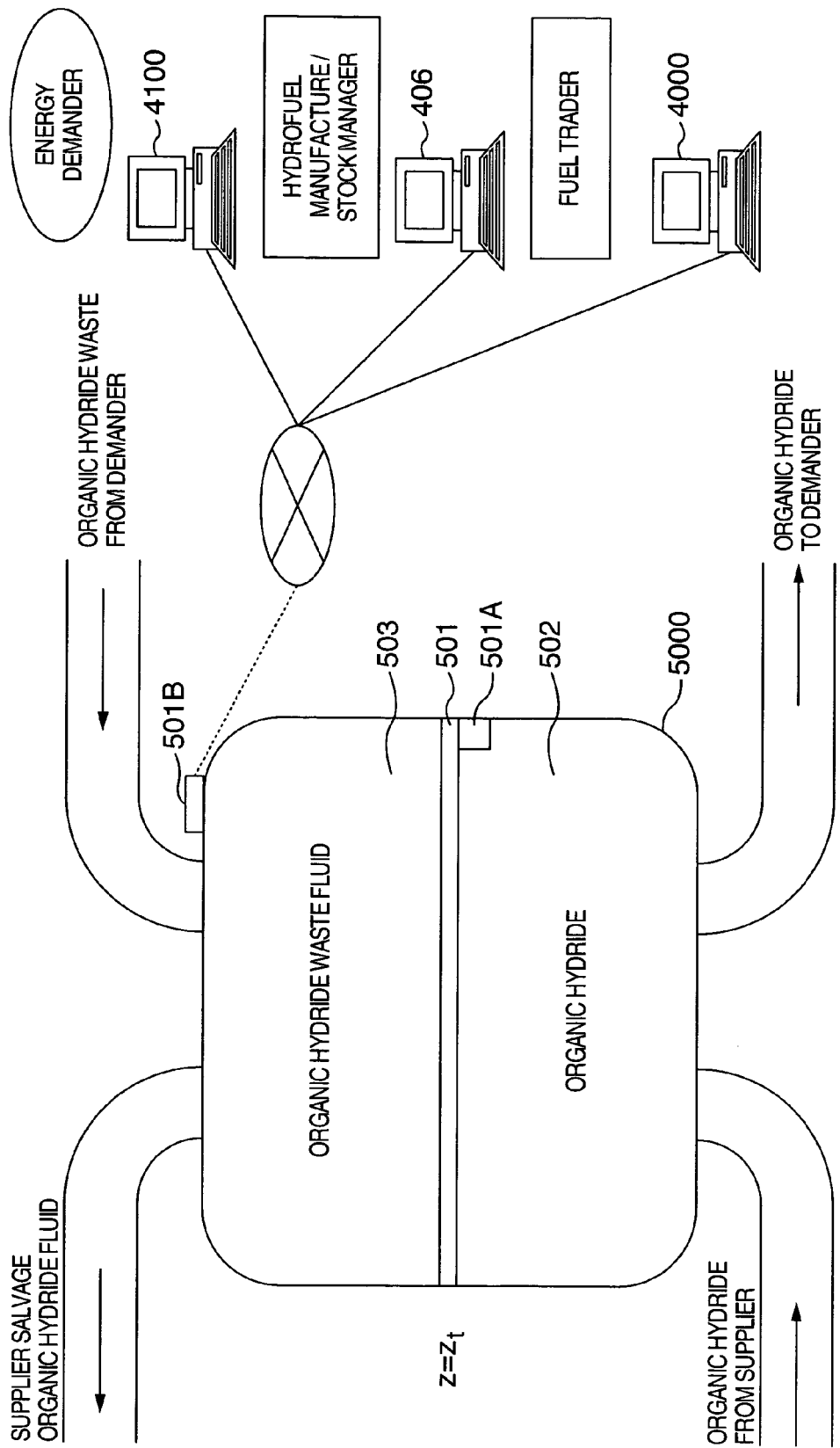
FIG. 5 is a diagram showing a structure of a hydrogen solution reservoir tank of the embodiment 2.

It should be noted that in this embodiment, a fuel production volume ratio is also determinable by the hydrogen residual fuel amount information owned by a fuel demander or consumer. Although there is a scheme for permitting an energy demander to report the residual fuel amount information by using a personal computer (PC) or the like that is linked to his or her proprietary demander server 4100, automatization is enabled by attaching a sensor to a fuel tank or else. An explanation will be given of an organic hydride residual amount management method by way of example. In the case of the organic hydride, waste fluid salvage is also necessary. Thus a shield plate 501 is provided in a solution stock tank 5000 whereby the tank interior space is divided by the shield plate into a hydride reservoir unit 502 and a waste fluid salvage unit 503 as shown in FIG. 5 so that the tank becomes effectively utilizable. In order to measure the position of this shield plate of the tank, a position sensor is attached to a portion capable of measuring the shield plate or the shield plate position, thereby enabling measurement of a residual amount of the waste fluid or organic hydride. In this case, a wirelessly linked or wired information communication means becomes necessary in order to report the sensor information to either an energy demanding person or a fuel monitor center. At this time, the information to be sent may include the position of the shield plate as measured from a tank bottom face at any given time point. To this end, the position sensor and a sensor data managing device 501B are required in association with the tank as shown in FIG. 5. The sensor data managing device receives information from the sensor via wired or wireless links and stores the data in a memory in the form of a table or in a text form or the like and then transfers the data to a user upon receipt of a request therefrom. It is also possible to send the data at regular time intervals. In a similar way to these data, every sensor is designable to have its own identification (ID) number code whereby it becomes possible to manage data from many sensors in an all-at-once manner. The information being sent will be received by more than one of the power generation amount management server 4000, demander server 4100 and hydrogen fuel manufacture/stock management server 406 and then stored in the terminal(s). A display image of the information is different depending upon the demander, power generation amount manager server, hydrogen fuel manufacture/stock manager server and fuel supplier. For the demander, residual fuel amount data is displayed whenever the need arises. The residual fuel amount data is a fuel amount that is predictable from the height of a liquid surface of an organic hydride within a fuel tank to be obtained from a sensor and the cross-sectional area of the tank. A prospective fuel amount is processed by its own server and a dedicated terminal or a sensor data managing device associated with the fuel tank and is then sent together with sensor data. With such an arrangement, it becomes possible to effectively supply the hydrogen in a way pursuant to the demander's desired form.

On the other hand, the power generation amount management server 4000 and hydrogen fuel manufacture/stock management server 406 may also be designed to visually display a present residual fuel amount similar to that of the demander and also display a fuel consumption amount per time. Analyzing these data makes it possible to achieve planned refueling. In FIG. 5, "Z" shows a position of the shield plate 501 in a vertical direction within the solution stock tank 5000. "$Z_t$" indicates the positions of the plate 501 at a time "t".

As for the high-pressure fuel, employ a scheme which follows. A supply method of the high-pressure fuel is such that this fuel is temporarily stocked in a high-pressure tank and then supplied. The high-pressure tank has therein a temperature sensor and a pressure sensor, for reporting pressure and temperature data to a demander, hydrogen fuel manufacturer or fuel monitor center wirelessly or via wired links. Additionally each sensor performs sensor data send/receive operations at a sensor data managing device in a similar way to that stated supra. Using the sensor data, calculate the hydrogen's molecular weight n (mol) in accordance with the equation of ideal gas. Here, letting P indicate a pressure within the tank, V denote a tank volume, T designate a temperature in the tank, and R denote the gas constant, the value n is given as:

$$n=PV/RT \qquad (2)$$

The calculation of Equation (2) is processed by its own server and dedicated terminal or the fuel tank-associated sensor data managing device and is then transmitted together with the sensor data. The information thus sent will be received by a demander, fuel monitor center and/or fuel-manufacturing business entity and then stored in its own server and dedicated terminal.

A display image of the information is different depending on the demander and hydrogen fuel manufacture/stock management server in a similar way to that of the above-noted stock tank: only a residual amount image is sent to the demanders whereas the remaining information items are also sendable to the others. Next, the hydrogen fuel manufacture/stock management server receives surplus power amount data and residual fuel amount data to be sent from each location and then determines each hydrogen fuel production volume. A flow of this process of this embodiment is shown in a flow chart of FIG. 6. In this embodiment, this process flow is systematized.

The hydrogen fuel manufacture/stock management server receives residual fuel amount information being sent from a demander or consumer or else (at step 601). The information thus received is input to a fuel management sheet shown for example in FIG. 7 and then stored in a server (step 602). The information is stored in units of demanders. Preferably the fuel management performs with-time change of a residual fuel amount for management per time as shown in FIG. 7. Additionally this information is recorded on a per-day basis as shown in FIG. 8. Also preferably, as shown at lower part of FIG. 8, calculate a per-day usage amount and a per-year use amount (603).

Figure 9:
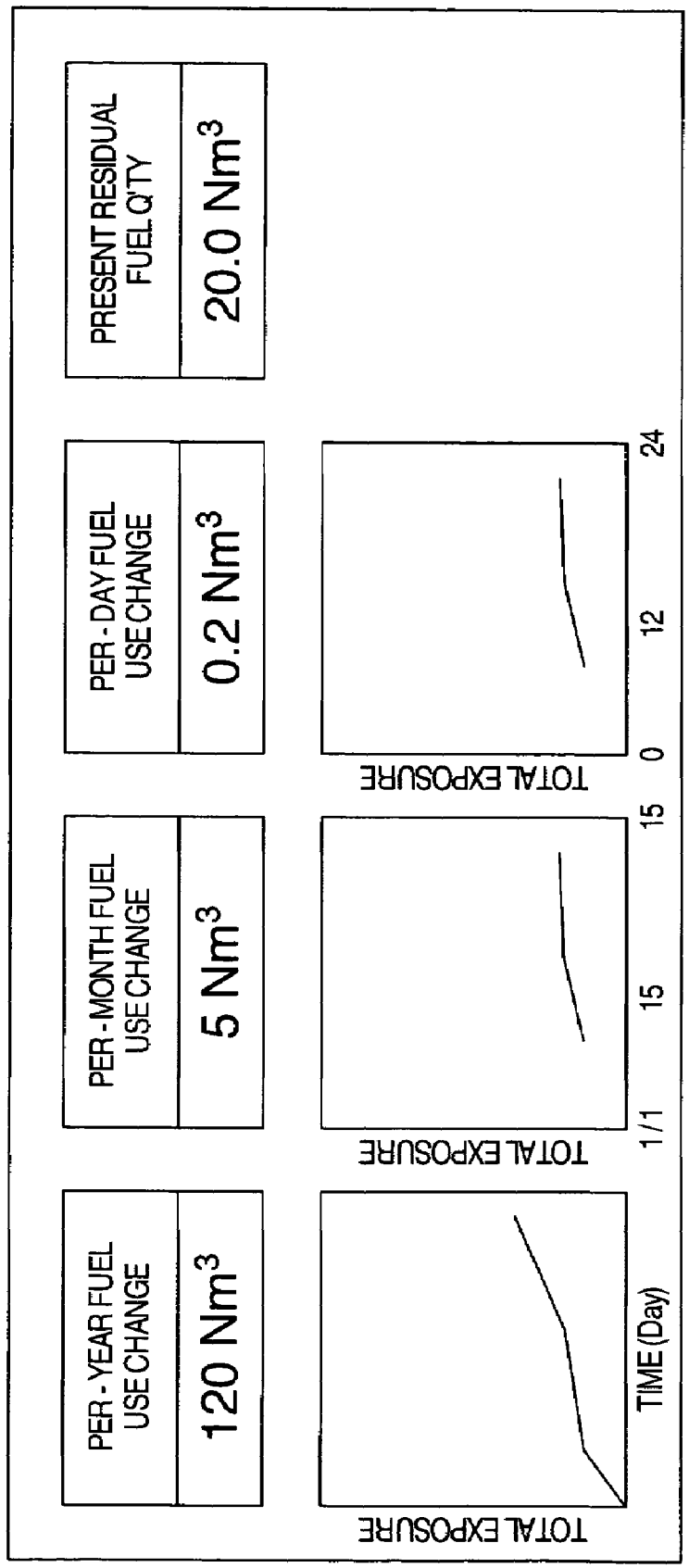
FIG. 9 is a diagram showing a structure of fuel use amount data of each demander (Part 2).

These fuel use amounts make it possible to display a screen image that gives an administrator the annual, per-day and per-time fuel use circumstances such as shown in FIG. 9, for example. This enables the administrator to grasp at a glance the track record or "history" of the fuel use circumstances. Next, perform identification of the fuel kind; then, register the fuel kind of a demander "A" (at steps 604 to 606 in FIG. 6). The fuel kind identification is achieved by specifying the tank type from individual identification (ID) information of each sensor being contained in the information to be sent. Note here that each server has several information items including but not limited to the individual ID of a sensor, the type of a tank, the information as to a fuel demander or consumer who owns the tank, a tank installation location, a tank volume, and a fuel kind.

Figure 6:
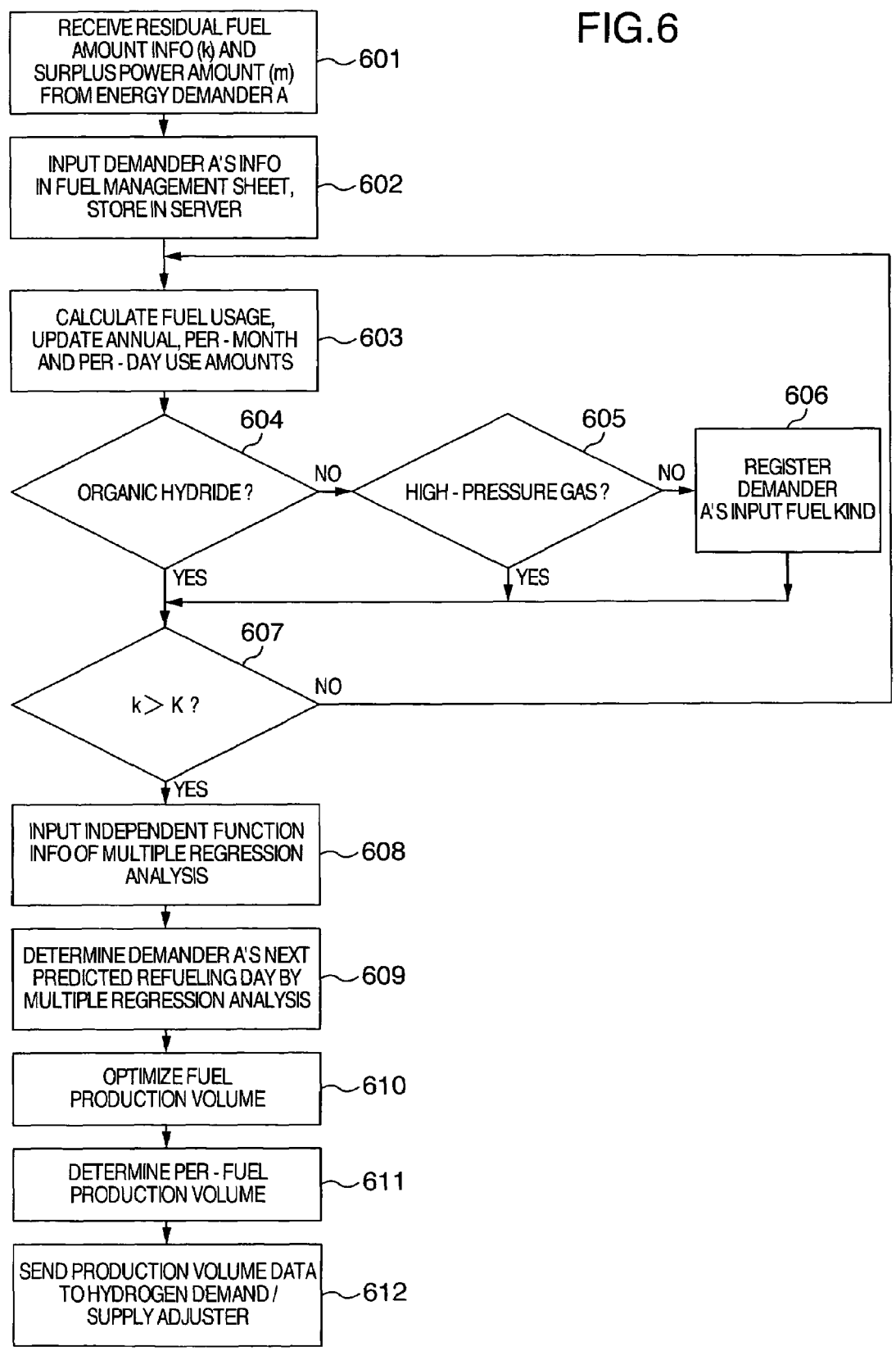
FIG. 6 is a diagram showing a hydrogen production volume control method of the embodiment 2.

After having identified the fuel kind, the residual amount information is used to affirm whether the demander's fuel amount is lower than a rated value that is set within a system of the demander or fuel monitor center (at step 607). If the demander's fuel amount is larger than the rated value, as shown in FIG. 6, the flow goes back to step 603 in this embodiment. The flow however may proceed to any other step than step 603 in accordance with various possible factors such as design conditions. It is desirable that the rated value is determined by a contract or else between the demander and the fuel supplier because if the fuel becomes empty then a risk arises as to the inability to supply any fuel to the power supply. In case the rated value is set at K, this is compared with a present residual fuel amount k; if K<k, then manufacture the fuel demanded. The hydrogen fuel manufacture/stock management server predicts an expected fuel refilling date based on the fuel use circumstances and others. For example, a prediction method is designed to employ multiple regression analysis with dependent variables being the fuel use amount, weather, air temperature, fuel demander, fuel kind, wind direction, humidity, etc. Each information is available via wired or wireless communication links from those sensors installed at the tank and the demander's fuel consumption location in a similar way to the case stated supra. Optionally, regarding part of the information, it is also possible to acquire the data of information web sites in a global network such as the Internet. Whereby a time point whereat the residual fuel amount becomes zero is predicted through outline assumption. It is also possible for the hydrogen fuel manufacturer to support optimization or the like based on this residual fuel amount data and/or various data of the demander. One typical technique therefor will be explained below.

An explanation will be given of a case where the fuel supplier moves and supplies fuel to a hydrogen fuel supply location such as a home or a factory. The hydrogen fuel to be delivered here may suitably be a relatively safe fuel, such as organic hydride. It is required for the fuel supply to deliver the fuel as efficiently as possible to thereby reduce transportation costs. In the hydrogen fuel manufacture/stock management server, this server performs optimization of a delivery date and delivery route from each demander's residual fuel amount and a due date on which each hydrogen fuel becomes zero plus a fuel tank installation location. An exemplary algorithm of such optimization is as follows. Firstly, level division is performed pursuant to a residual fuel amount. The set level is settable from the tank volume, residual fuel amount, rated value K, fuel consumption history and others. With this level as a reference, the hydrogen fuel manufacture/stock management server performs hydrogen fuel production for a chosen demander house with its level exceeding the rated level.

Note that in this event, the hydrogen fuel manufacture/stock management server employs a technique for minimizing the distance of a delivery route along which the supplier visits each demander's house. Here, each demander house is different in hydrogen fuel use circumstance so that the time schedule until arrival at the rated level is supposed to differ significantly. For this reason, perform prediction of the day of the hydrogen fuel becoming zero in amount (at step 609 in FIG. 6), and the supplier performs delivery of the hydrogen fuel on the day that the hydrogen fuel of a certain demander's house becomes zero or its preceding day to thereby perform optimization in such a way as to deliver the fuel in case the demander's tank is present along the delivery route even when the level is low in such event. In this case, it becomes possible to deliver to many demander houses at a time although the risk is high, thus making it possible to reduce or cut down the transportation cost. Then, the hydrogen fuel manufacture/stock manager server performs adjustment of the production volume of a demander house present on the delivery route and then calculates a finally optimized hydrogen fuel amount to thereby determine the production volume (at step 611), for delivering the hydrogen to a hydrogen fuel device.

On the contrary, in case a demander moves and visits a hydrogen fuel supply location of fuel supplier to refill high-pressure hydrogen for use as an automobile fuel, the demander's ID code and residual fuel amount information are transmitted from a sensor installed in the demander's tank toward the hydrogen fuel manufacture/stock management server (at step 612 of FIG. 6). Additionally, either the fuel supplier or the hydrogen fuel manufacturer identifies a present location of the demander from the position information of a global positioning system (GPS) or the sensor, and then reports the location that permits the demander to refuel or an optimal location. A method of reporting is preferably built in a land vehicle as its dedicated system in conjunction with an electronics system with mailing, audio guidance and car navigation functions.

The demander selects a fuel supply location from among a plurality of refuel locations that are designated by the fuel supplier, and then goes to such selected location to take on additional fuel. A fuel tank for automobile use is connected via an air-tightly sealed connection line to an externally accessible filler neck. The filler neck is disposed external to a land vehicle.

The automobile-use fuel tank comprises, on its inner wall, more than one sensor with data send/receive functions. Typically a pressure sensor and a temperature sensor are attached in a sensor module. These sensors are used to measure values within the fuel tank, thereby making it possible to obtain an instantaneous pressure and an instantaneous temperature in the tank. A sensor network is provided with wireless communication functionality as described previously. Thus it is possible to wirelessly transfer the measured values that are detected by the sensors toward the hydrogen fuel manufacture/stock management server.

Based on the data sent from the sensors, perform the level division of residual fuel amount management in response to a present residual fuel amount. As in the above-noted case, the set level is settable from the tank volume, residual fuel amount, rated value K, fuel consumption history and others. With this level as a reference, the hydrogen fuel manufacture/stock management server performs hydrogen fuel production for a specific demander with its level exceeding the rated level. Note here that this level is in common with that of the aforesaid home-use hydrogen fuel, and the production volume is determined by the hydrogen fuel manufacture/stock manager server while taking account of the residual amount management of each hydrogen fuel.

Additionally, upon supplying of automobile-use hydrogen fuel at a hydrogen fuel supplying place, the fuel tank-attached sensors are utilized. One example thereof will be indicated below.

The hydrogen fuel supply place consists essentially of a fuel supplying machine and a fuel reservoir unit in which a fuel gas is stocked. The hydrogen fuel supplying machine is generally made up of a fuel supply nozzle having an antenna for receiving data to be sent by the sensor net, a central processing unit (CPU) for processing the transmitted data to determine the open degree of a valve, a memory for storing therein the sent data and the processing results of the CPU, a valve control unit for controlling the valve in deference to the CPU's processing results, and the valve being driven by the valve control unit.

The gas refilling is performed by inserting the fuel supply nozzle into the fuel tank through the land vehicle's filler neck and air-tight connection line. At this time a structure is employed for allowing the antenna also to enter the interior of the fuel tank. The fuel supply machine receives by the antenna the data being sent from the sensors immediately after the insertion of the fuel supply nozzle or alternatively after completion of a certain operation and then evaluates the data by means of the CPU or alternatively evaluates by the CPU the data in the memory after having stored in the memory.

Figure 10:
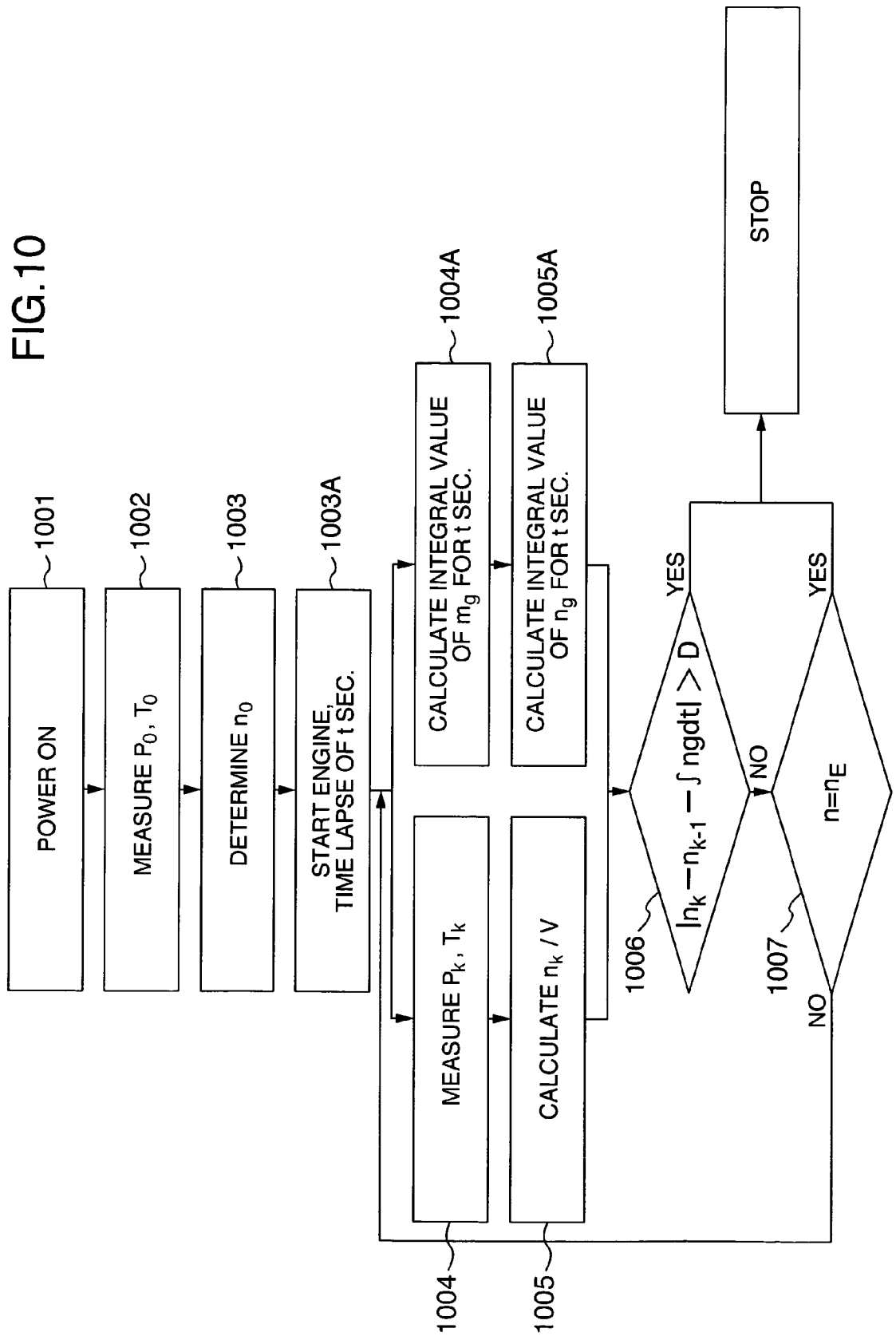
FIG. 10 is a diagram showing a gas key-point evaluation method of the embodiment 2.

With the gas filling evaluation scheme in accordance with this embodiment, it is possible by the value to be sent from the sensor to obtain an instantaneous filling state within the fuel tank. A typical example of such evaluation method is to use the molar number of a gas within the tank. This will be explained in detail along a flow chart of FIG. 10 below.

As a result of this, injection becomes possible without causing the limit amount of a gas being injected into the fuel tank to be affected by its ambient temperatures.

For the molar number n within the fuel tank, use the measured values of the sensors being disposed within the fuel tank and individual identification information. Here, the sensor's individual identification number is taken into consideration in units of car bodies or tanks. This number is sent via the sensor net and is then received by the fuel refill machine through its antenna. When the CPU recognizes this number, it becomes possible to obtain in situ the tank's volume V (fixed value) and tank injection fuel kind, while regarding as key data the memory-stored carbody number and the ID number as sent from a tank table.

From the ideal gas equation, the following equation (2) is derived. Here, P is the internal pressure of the fuel tank, T is its inside temperature, and R is the gas constant. Accordingly, it is possible, by measuring the fuel tank inner pressure P and temperature T using the pressure/temperature sensors, to obtain the molar number n of the gas within the fuel tank.

With this scheme, when inserting the fuel supply nozzle into the tank, receive the data (initial pressure $P_0$, initial temperature $T_0$, tank volume V) from the sensors, and then use the data to evaluate a present residual gas amount $n_0$ in the tank.

Next, start gas injection into the tank. At this time, the valve control unit opens the valve of the fuel refilling machine in accordance with the residual gas amount $n_0$, thereby permitting a gas to leave the fuel stock unit. Thus the fuel begins to be refilled into the tank. During refueling, the pressure and temperature sensors transmit data indicative of a pressure $P_k$ and a temperature $T_k$ within the fuel tank toward the fuel refill machine at all times or at fixed time intervals. The fuel refill machine calculates a refilling degree $n_k$ of the tank in every data send event, for changing the open degree of the valve.

In addition, by attaching in this case a flow rate sensor to any part of a pipeline extending from the gaseous fuel stock unit up to the fuel supply nozzle, it becomes possible to rapidly detect gas leakage and flow abnormality. In this embodiment, there will be shown an example which measures the flow rate by using a mass flow meter.

The mass flow meter measures the mass $m_g$ of a flowing gas.

From the gas equation, the moving distance $n_g$ of a flowing gas is given as:

$$n_g = m_g \cdot z = P_k \cdot V / RT_k.$$

A method of detecting the abnormality includes the step of setting up an abnormal threshold value D. More specifically, whenever the gas supply amount $n_g$ per unit time becomes more than or equal to D with respect to a gas amount $n_k - n_k - 1$ within the fuel tank, the supply is interrupted. With this technique, it becomes possible to supply the fuel to the fuel tank more safely.

An explanation will next be given of a technique for performing halt of the fuel supply to the fuel tank. The fuel supply halt is done by designating either the individual ID information of a sensor or any given supply quantity. Concerning the individual ID information, the number to be sent from the sensor is received by the sensor net and then received by the fuel refilling machine via the antenna. When this number is recognized by the CPU, it becomes possible to obtain in situ a filling amount $n_e$ that is specified to the tank, while regarding as key data the memory-stored carbody number and the ID number as sent from the tank table. It is also possible to set up any given supply amount $n_e$ through a certain operation on the fuel refilling machine side. When $n_e = n_k$, let the valve be closed completely, resulting in halt of the fuel supply.

Although in the above-stated method everything is processed within the fuel refilling machine, it is also permissible to provide a server external to the fuel refilling machine for performing these control operations or information storage at this server.

Safer and expeditious fuel refilling becomes possible by using the above-noted method to store a fuel injection amount control program in either the memory or the server on a per-vehicle or per-tank basis and by letting the CPU judge a car type and tank based on the ID information coming from the sensor net and then executing such program.

Next, a detailed explanation will be given as to an embodiment of the invention in the case of using it as a device for measuring and displaying a residual fuel amount within the tank of a land vehicle while referring to the accompanying drawings. A device that has an antenna and wireless communication functions is attached to either a filler neck or a filler cap to thereby enable information to be sent and received to and from the sensor net within a tank. On the other hand, this antenna and the wireless communication device is communicable via a wired or wireless link with a residual fuel amount visualizing device that is installed within the land vehicle. This residual fuel amount visualizer device is made up of a wireless communication device for receiving a signal from the sensor net, a CPU which calculates the received signal with the value of a sensor as a tank residual amount and which provides the tank residual amount visualizer device with an instruction for displaying the calculation result, the tank residual amount visualizer device for displaying the information from the CPU, and a memory for storing the CPU's calculation result.

With the in-tank residual fuel amount measurement and display scheme in accordance with this embodiment, it is possible to obtain an instantaneous filled state within a fuel tank by the value being sent from the sensor. An evaluation method therefor is arranged to use the molar number of a gas within an automobile fuel tank as a parameter in a similar way to that of the embodiment stated supra.

The molar number n within the fuel tank is definable by using the measurement values of the sensors as disposed within the fuel tank and individual identification (ID) information thereof. Here, the individual sensor ID information is the one that is considered on a per-carbody basis or per-tank basis. This number is sent by the sensor net and then received by a tank residual amount information visualizer device via either a wireless communication link or a wired link between antennas. When the CPU inputs pressure and temperature information from the sensors, it calculates the in-tank residual fuel amount n in units of moles. The molar number thus calculated is rewritten into a given unit system and then displayed at the visualizer device. Below is a detailed explanation with reference to a flowchart of FIG. 10.

Upon power-up of a land vehicle (at step 1001), an initial pressure and temperature within its fuel tank are transmitted from the sensors to the tank residual amount visualizer device (1002). The CPU uses the above-described ideal gas equation to calculate a residual gas amount n (1003); then, this result is displayed at the visualizer device. In the visualization event, the value n is directly displayed with no changes. It is also possible to display a ratio, $n/n_f$, relative to a molar number $n_f$ in the case of the tank being full of the fuel or alternatively display it in other unit systems.

Upon startup of the engine (1003A), the fuel within the tank decreases. During operation of the engine, the pressure and temperature sensors send a pressure $P_k$ and temperature $T_k$ within the fuel tank toward the tank residual amount visualizer device constantly or at time intervals of t seconds (1004). The tank residual amount visualizer device calculates a tank filling degree $n_k$ whenever the data is sent thereto.

Additionally, by attaching at this time a flow rate sensor to any part of a fuel gas delivery pipeline coupling between the fuel tank and the engine, it becomes possible to rapidly detect gas leakage and flow abnormality. In this embodiment, there will be shown an example which measures the flow rate by use of a mass flow meter.

The mass flow meter measures the mass $m_g$ of a flowing gas.

From the gas equation, the moved distance $n_g$ of the flowing gas is represented by:

$$n_g = m_g \cdot z = P_k \cdot V / RT_k.$$

A method of detecting the abnormality includes the step of setting up an abnormal threshold value D. More specifically, whenever the gas supply amount $n_g$ per unit time becomes more than or equal to D with respect to a gas amount $n_k - n_k - 1$ within the fuel tank (at step 1006 of FIG. 10), the supply is halted. Thus it becomes possible to supply the fuel to the fuel tank more safely.

An explanation will next be given of a technique for performing halt of the fuel supply to the fuel tank. The fuel supply halt is done by designating either the individual ID information of a sensor or any given supply quantity. As for the individual ID information, the number to be sent from the sensor is received by the sensor net and then received by the fuel refilling machine via the antenna. When this number is recognized by the CPU, it becomes possible to obtain in situ a filling amount $n_e$ that is specified to the tank, while regarding as key data the memory-stored carbody number and the ID number as sent from the tank table. It is also possible to set up any given supply amount $n_e$ through a certain operation on the fuel refilling machine side. When $n_e=n_k$ (at step 1007), close the valve completely, resulting in halt of the fuel supply.

In this way, it becomes possible for a demander to receive refill of any given fuel from the fuel supplier. This makes it possible to refuel his or her land vehicle without asking for other people's help. As apparent from the foregoing, it becomes possible to supply demanders with many hydrogen fuels smoothly and efficiently, by using a procedure having the steps of sending hydrogen fuel consumption information obtainable by sensors or the like to the hydrogen fuel manufacture/stock management server, processing this information within the hydrogen fuel manufacture/stock manager server, making a hydrogen fuel manufacturing plan, determining a production volume of hydrogen fuel, and letting the hydrogen fuel manufacture/stock management apparatus deliver the hydrogen produced by the hydrogen manufacturing apparatus to each hydrogen fuel manufacturing apparatus.

Embodiment 3

This embodiment is related to a basic configuration in a multi-hydrogen fuel supply system and hydrogen fuel supply method.

Figure 11:
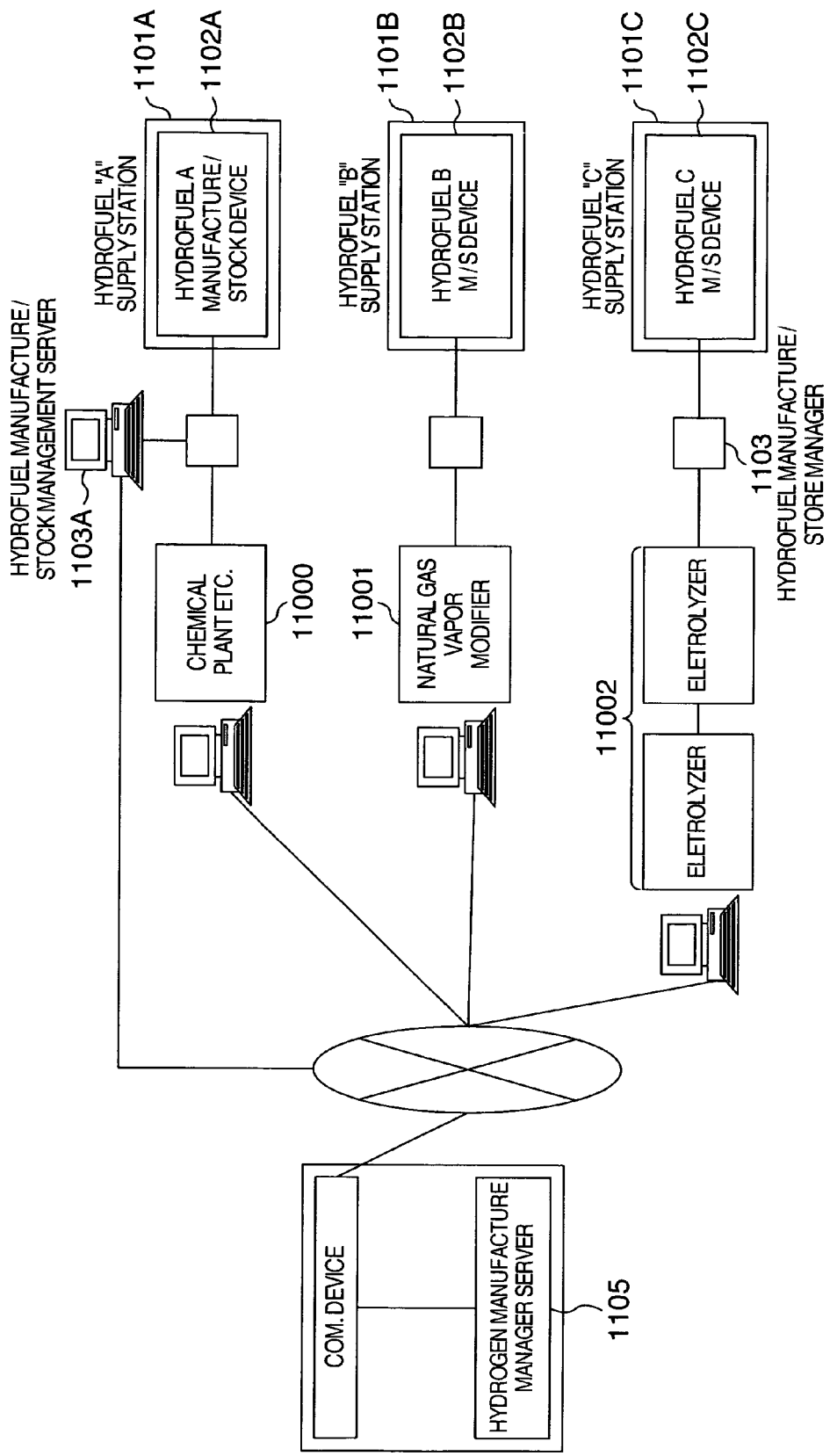
FIG. 11 is a diagram showing a hydrogen fuel supply system of an embodiment 3.

See FIG. 11, which shows a configuration of the multi-hydrogen fuel supply system of this embodiment. As shown herein, the multi-hydrogen fuel supply system includes a plurality of hydrogen fuel supplying stations 1101A to 1101C, each having one or more hydrogen fuel manufacture/storage devices 1102A-1102C. Each hydrogen fuel manufacture/stock device is provided with a built-in supply device for supplying fuel to a hydrogen fuel demander's house.

This embodiment shows an example that offers expected improvements in hydrogen fuel manufacturing efficiency in case a hydrogen manufactory and a multi-hydrogen fuel supply station are adjacent to each other.

A configuration of this embodiment is shown. It is basically constructed from a hydrogen manufacture management server 1105 provided in the hydrogen manufacturing apparatus for managing the production volume of hydrogen and a hydrogen fuel manufacture management apparatus or hydrogen fuel production volume management server 1103A, which is provided in a hydrogen fuel manufacture/stock management apparatus 1103 that resides between the hydrogen manufacture apparatus and hydrogen fuel manufacture/stock apparatus and which controls the production volume of hydrogen fuel.

Although in this embodiment an exemplary hydrogen manufacturing method is shown which employs an electrolyzer device that uses by-product hydrogen of a chemical plant 11000 or electronic material factory—for example, secondary product hydrogen obtainable from exhaust gases in silicon anneal processes of a semiconductor fabrication factory—or surplus electric power of nuclear power generation along with a water vapor modifying device 11001 for changing or altering the quality of a natural gas, this invention should not exclusively be limited thereto.

The hydrogen that is produced by each hydrogen manufactory is sent to the hydrogen fuel manufacture/stock management apparatus. Then, determine each hydrogen fuel production volume based on a generated hydrogen amount and each hydrogen fuel consumption information as received by the hydrogen fuel manufacture/stock management server 1103A, for delivery to each hydrogen fuel manufacture/stock apparatus.

At this time, the hydrogen being manufactured from each manufactory is added various energies, such as the pressure and heat and others. In this embodiment, these energies are effectively utilized to enable achievement of increased efficiency of hydrogen fuel production.

The hydrogen manufactured from the chemical plant is added pressure and heat energies. In case a supply method is a high-pressure tank, a need is felt to provide between the hydrogen manufacturing apparatus and hydrogen stock apparatus a device that adds a high pressure to the hydrogen. In this case also, it becomes possible by using the pressure being added upon creation of by-product hydrogen to reduce the degree of a pressure to be added to the by-product hydrogen by the high-pressure adding device, resulting in an improvement in energy efficiency in pressure adding events. For example, in the case of adding a pressure of 100 MPa to the hydrogen, several compressing machines are typically series-coupled together for performing multiple-stage compression, thereby letting it reach a target pressure. In this case, the added energy is lessened by a degree corresponding to the pressure component added to the by-product hydrogen. However, in the case of supply with a tank, a compression loss occurring upon transferring becomes larger while increasing transportation costs. In view of this, it is preferable to employ a scheme for manufacturing the hydrogen fuel while coupling by pipelines between hydrogen fuel supply stations and hydrogen fuel manufacturing apparatus. With such an arrangement, it is possible to effectively utilize the pressure and heat energies to be added to the hydrogen at the time the by-product hydrogen takes place. At this time, for considering the efficiency improvement, it is required to perform optimization of the hydrogen manufacturing method, hydrogen transport lines and hydrogen fuel manufacture. For example, the hydrogen being released from the chemical plant appears to be added heat and pressure. Thus it is preferable for the hydrogen fuel under manufacture to put a production line of high-pressure hydrogen that requires the pressure and an organic hydride that requires heat for fabrication and others. In the electrolyzation, the manufactured hydrogen exhaust amount along with the heat and pressure are adjustable. Thus, it becomes possible to control the hydrogen fuel manufacture by controlling an electrolyzer 11002 in a way depending on the hydrogen fuel specie and amount required.

By controlling a combination of hydrogen fuel manufacture from these hydrogen production processes while taking account of the demanded quantity and the operating rates of respective devices and factories, it becomes possible to further improve the hydrogen fuel manufacturing efficiency.

Figure 12:
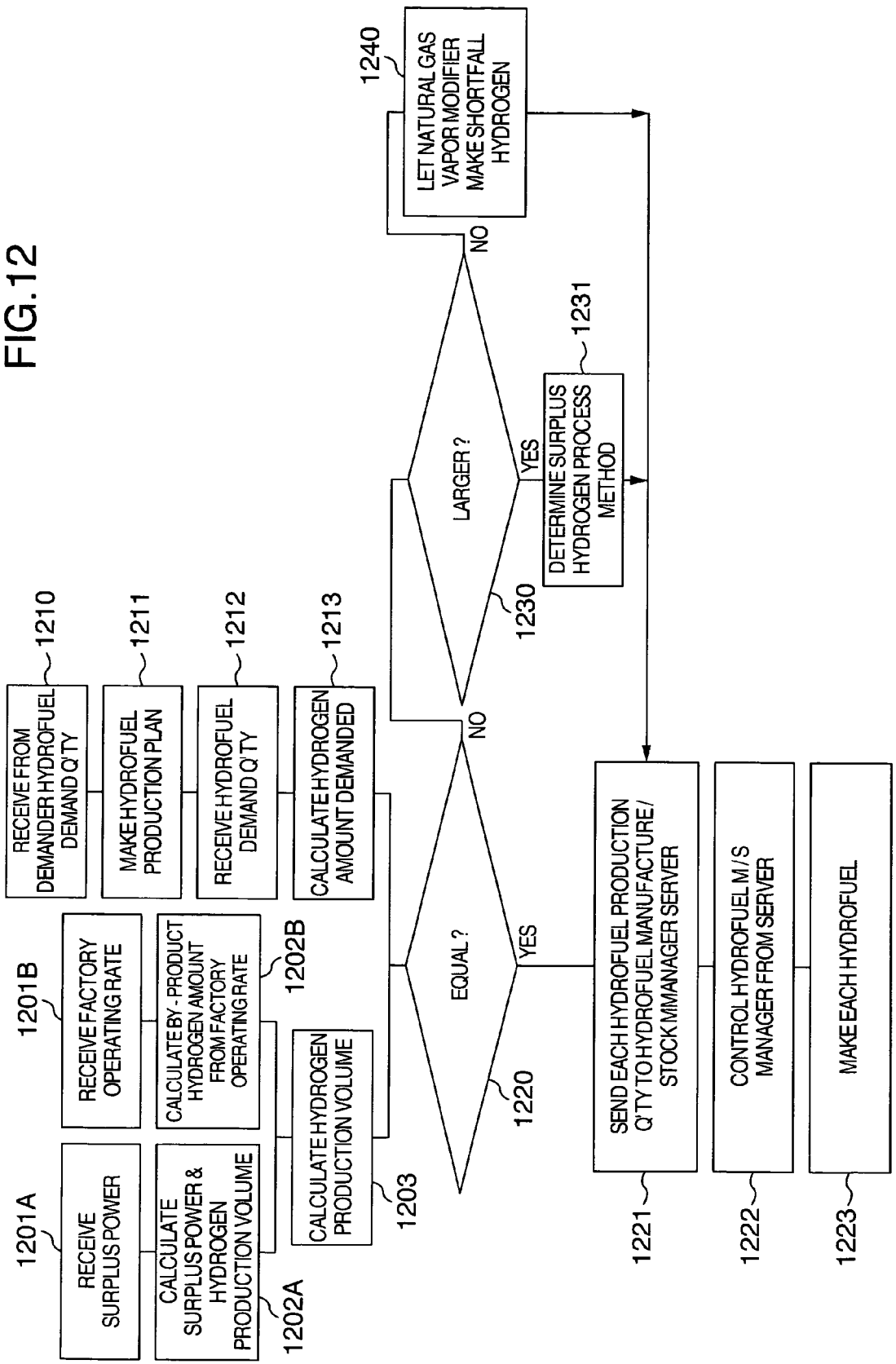
FIG. 12 is a diagram showing a hydrogen fuel manufacturing method of the embodiment 3.

In this embodiment, the hydrogen is supplied to demander houses in the form of a high-pressure gas, organic hydride or liquid hydrogen. Next, a process flow covering from the hydrogen production up to hydrogen fuel manufacture is shown in FIG. 12. First, in the process stated supra, the hydrogen manufacture management server receives from each server the information as to a surplus electric power amount and factory operation rate (at steps 1201A, 1201B). Based on this information, each hydrogen production volume is calculated within the hydrogen manufacture management server (1202A, 1202B, 1203).

On the other hand, the hydrogen manufacture management server receives from a demander his or her required hydrogen fuel amount while receiving a hydrogen fuel manufacturing plan or else from the hydrogen fuel manufacture/stock management server (at step 1210) and then calculates a necessary hydrogen amount with respect to the hydrogen fuel amount (1211, 1212, 1213).

Further, compare the hydrogen production volume with the necessary hydrogen amount (1220). If the hydrogen production volume is equal to the necessary hydrogen amount, then control the hydrogen fuel manufacture/stock management apparatus from the hydrogen fuel manufacture/stock management server (1221, 1222), next deliver hydrogen corresponding to the necessary hydrogen fuel amount to thereby manufacture each hydrogen fuel. At this time, from the information concerning the pressure and temperature being added to the hydrogen during production of the hydrogen, determine the allocation of respective production volumes of the liquid hydrogen, organic hydride and/or high-pressure hydrogen (1223).

Alternatively, in case the hydrogen production volume is greater than the necessary hydrogen amount, the way of managing a surplus hydrogen amount becomes an important issue. Here, the hydrogen manufacture management apparatus or the hydrogen fuel manufacture/stock management server receives from a demander house or else the information as to each fuel use amount, weather, ambient temperature, demander, fuel kind, wind direction, humidity and others. By multiple regression analysis with these information items as independent variables, perform prediction of each hydrogen fuel demand to thereby determine a hydrogen fuel manufacturing plan with the use of surplus hydrogen (1231). Thus the hydrogen fuel manufacturing quantity at each moment is determined, permitting pre-manufacturing of a highly demanded kind of fuel and/or a certain kind of fuel that is large in production volume fluctuation.

Note here that the surplus electric power and the hydrogen manufacture in chemical plants are such that the hydrogen production volume is predefined in many cases so that the hydrogen production volume is sometimes less than the necessary hydrogen amount. If this is the case, use a natural gas vapor modifier to manufacture a shortfall degree of hydrogen (1240). Additionally, through comparison of costs of ordinary electric power and natural gas, if the power cost is less than the natural gas cost then it becomes possible to manufacture hydrogen low in $CO_2$ emission.

Also note that in this embodiment, the hydrogen fuel manufacture/stock management server and the hydrogen manufacture management server may be integrated together or, alternatively, only either one of them is employable while letting it offer the functionalities of the both.

By the use of the above-described procedure having the steps of making a hydrogen fuel manufacturing plan from the hydrogen production volume information at the hydrogen manufacture manager server, sending it to the hydrogen fuel manufacture/stock manager server, processing this information within the hydrogen fuel manufacture/stock manager server to determine a hydrogen fuel production volume, and permitting the hydrogen fuel manufacture/stock management apparatus to deliver the hydrogen that was created by the hydrogen manufacturing apparatus toward each hydrogen fuel manufacturing apparatus, it becomes possible to supply many hydrogen fuels to demanders smoothly and efficiently while at the same time enabling accomplishment of environment-friendly and highly ecological mass-production of hydrogen fuels. Note that the functionalities stated above may be realized by an arrangement that uses software programs to allow a computer(s) to offer similar capabilities.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A hydrogen fuel manufacturing system comprising:
   an apparatus for manufacturing hydrogen; and
   at least two hydrogen fuel manufacturing apparatuses for manufacturing hydrogen fuel from the hydrogen to obtain at least two types of fuel, characterized in that the hydrogen fuel manufacturing apparatuses are adapted to manufacture the fuels by use of a surplus energy emitted from hydrogen production.

2. The system according to claim 1, wherein said hydrogen fuel manufacturing apparatuses include a device for receiving information as to a hydrogen fuel production volume, for controlling a production volume of hydrogen fuel being manufactured by said hydrogen fuel manufacturing apparatuses based on the received information.

3. The system according to claim 1, wherein the fuel types include any one of a high-pressure hydrogen, a hydrogen-absorbed metal, a liquefied hydrogen and an organic hydride.

4. The system according to claim 1, further comprising:
   a hydrogen fuel manufacture/stock management device connected to said apparatus for manufacturing hydrogen and said at least two hydrogen fuel manufacturing apparatuses,
   a pipe for supplying hydrogen from said apparatus for manufacturing hydrogen to said hydrogen fuel manufacturing apparatuses,
   a valve disposed in said pipe,
   a hydrogen flow rate sensor for detecting a flow rate of the hydrogen passing through said pipe, and
   a receiving device for receiving information concerning a production volume of said hydrogen fuel,
   wherein said valve is controlled in its open degree based on the information received by said hydrogen fuel production volume receiving device.

5. The system according to claim 1, wherein said hydrogen fuel manufacturing apparatuses have a device for receiving information as to a hydrogen fuel use amount of a consumer house, for controlling a production volume of hydrogen fuel to be manufactured by said hydrogen fuel manufacturing apparatuses, based on the information received by said device.

6. The system according to claim 1, wherein an amount of hydrogen fuel is controlled in accordance with both an amount and type of the energy generated when manufacturing hydrogen.

7. A hydrogen fuel manufacturing method comprising:
   a step of manufacturing hydrogen by an apparatus for manufacturing hydrogen; and
   using at least two hydrogen fuel manufacturing apparatuses to manufacture hydrogen fuel from the hydrogen to obtain
   at least two types of fuel, and
   the fuels are manufactured by use of a surplus energy emitted from hydrogen production.

8. The hydrogen fuel manufacturing method according to claim 7, wherein said hydrogen fuel manufacture step has a step for receiving information as to a production volume of the hydrogen fuel, wherein the production volume of the hydrogen fuel being manufactured by said hydrogen fuel manufacturing apparatuses is controlled based on the received information.

9. The method according to claim 7, wherein in said hydrogen fuel manufacture step the fuel types include any one of a high-pressure hydrogen, a hydrogen-absorbed metal, a liquefied hydrogen and an organic hydride.

10. The method according to claim 7, wherein said hydrogen fuel manufacture step includes
a step for detecting a flow rate of the hydrogen passing through a pipe,
a step for receiving information as to a production volume of said hydrogen fuel, and
a step of controlling an open degree of a valve which is disposed in the pipe being provided between said apparatus for manufacturing hydrogen and said hydrogen fuel manufacturing apparatuses based on the received information as to a hydrogen fuel production volume.

11. The method according to claim 7, wherein an amount of hydrogen fuel is controlled in accordance with both an amount and type of the energy generated when manufacturing hydrogen.

* * * * *